(12) United States Patent
Wentworth et al.

(10) Patent No.: US 11,579,394 B2
(45) Date of Patent: *Feb. 14, 2023

(54) FIBER OPTIC BREAKOUT TRANSITION ASSEMBLY INCORPORATING EPOXY PLUG AND CABLE STRAIN RELIEF

(71) Applicant: COMMSCOPE TECHNOLOGIES LLC, Hickory, NC (US)

(72) Inventors: Michael J. Wentworth, Belle Plaine, MN (US); Kenneth Allen Skluzacek, Belle Plaine, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/150,601

(22) Filed: Jan. 15, 2021

(65) Prior Publication Data

US 2021/0141186 A1 May 13, 2021

Related U.S. Application Data

(63) Continuation of application No. 16/341,706, filed as application No. PCT/US2017/056053 on Oct. 11, 2017, now Pat. No. 10,914,909.

(Continued)

(51) Int. Cl.
    *G02B 6/00*     (2006.01)
    *G02B 6/44*     (2006.01)
    *G02B 6/38*     (2006.01)

(52) U.S. Cl.
    CPC ........... *G02B 6/4477* (2013.01); *G02B 6/387* (2013.01); *G02B 6/3878* (2013.01);

(Continued)

(58) Field of Classification Search
CPC .... G02B 6/4477; G02B 6/387; G02B 6/3878; G02B 6/3885; G02B 6/4471; G02B 6/4495; G02B 6/00
See application file for complete search history.

(56) References Cited

U.S. PATENT DOCUMENTS 4,299,244 A    11/1981   Hirai
4,351,579 A    9/1982   Kordes et al.
(Continued)

FOREIGN PATENT DOCUMENTS

AT      408 698 B    2/2002
CN      1289930 C    12/2006
(Continued)

OTHER PUBLICATIONS

24 Fiber Transition Housing by ADC Telecommunications, Inc., 2 pages, admitted as prior art as of Jun. 25, 2010.
(Continued)

*Primary Examiner* — Jennifer Doan
(74) *Attorney, Agent, or Firm* — Merchant & Gould P.C.

(57) ABSTRACT

A fiber optic cable transition assembly for transitioning a plurality of optical fibers from a multi-fiber cable to a plurality of furcation tubes. The fiber optic transition assembly has a housing with a front opening and an internal passageway that is defined by a wall and a narrow region. The housing is adapted to receive epoxy adhesive. The fiber optic transition assembly has a boot that is positioned at least partially inside the housing for receiving the multi-fiber cable to provide strain relief to the plurality of optical fibers extending therethrough. The fiber optic transition assembly has a plug supported by the boot and retained by the housing to prevent epoxy adhesive from entering the multi-fiber cable.

20 Claims, 13 Drawing Sheets

Related U.S. Application Data

(60) Provisional application No. 62/407,746, filed on Oct. 13, 2016.

(52) U.S. Cl.
CPC ......... *G02B 6/3885* (2013.01); *G02B 6/4471* (2013.01); *G02B 6/4495* (2013.01)

(56) References Cited

U.S. PATENT DOCUMENTS

| | | |
|---|---|---|
| 4,435,612 A | 3/1984 | Smith |
| 4,441,786 A | 4/1984 | Hulin et al. |
| 4,453,291 A | 6/1984 | Fidych |
| 4,461,529 A | 7/1984 | Fariss |
| 4,582,067 A | 4/1986 | Silverstein et al. |
| 4,650,933 A | 3/1987 | Benda et al. |
| 4,684,211 A | 8/1987 | Weber et al. |
| 4,768,961 A | 9/1988 | Lau |
| 4,770,639 A | 9/1988 | Lau |
| 4,775,121 A | 10/1988 | Carty |
| 4,791,245 A | 12/1988 | Thornley |
| 4,797,114 A | 1/1989 | Lau |
| 4,820,200 A | 4/1989 | Lau |
| 4,840,568 A | 6/1989 | Burroughs et al. |
| 4,917,491 A | 4/1990 | Ring et al. |
| 5,083,346 A | 1/1992 | Orton |
| 5,133,583 A | 7/1992 | Wagman et al. |
| 5,135,265 A | 8/1992 | Bouscher et al. |
| 5,146,532 A | 9/1992 | Hodge |
| 5,189,410 A | 2/1993 | Kosugi et al. |
| 5,199,878 A | 4/1993 | Dewey et al. |
| 5,214,673 A | 5/1993 | Morgenstern et al. |
| 5,231,688 A | 7/1993 | Zimmer |
| 5,317,663 A | 5/1994 | Beard et al. |
| 5,339,379 A | 8/1994 | Kutsch et al. |
| 5,363,465 A | 11/1994 | korkowski et al. |
| 5,364,389 A | 11/1994 | Anderson |
| 5,381,501 A | 1/1995 | Cardinal et al. |
| 5,393,249 A | 2/1995 | Morgenstern et al. |
| 5,416,874 A | 5/1995 | Giebel et al. |
| 5,432,875 A | 7/1995 | Korkowski et al. |
| 5,467,062 A | 11/1995 | Burroughs |
| 5,473,718 A | 12/1995 | Sommer |
| 5,497,444 A | 3/1996 | Wheeler |
| 5,514,128 A | 5/1996 | Hillsman et al. |
| 5,554,026 A | 9/1996 | Van Hale |
| 5,582,525 A | 12/1996 | Louwagie et al. |
| 5,598,500 A | 1/1997 | Crespel |
| 5,613,030 A | 3/1997 | Hoffer et al. |
| 5,627,925 A | 5/1997 | Alferness et al. |
| 5,645,519 A | 7/1997 | Lee et al. |
| 5,649,042 A | 7/1997 | Saito |
| 5,685,741 A | 11/1997 | Dewey et al. |
| 5,694,511 A | 12/1997 | Pimpinella et al. |
| 5,701,380 A | 12/1997 | Larson et al. |
| 5,717,810 A | 2/1998 | Wheeler |
| 5,754,725 A | 5/1998 | Kuder et al. |
| 5,838,861 A | 11/1998 | Bunde |
| 5,863,083 A | 1/1999 | Giebel et al. |
| 5,879,075 A | 3/1999 | Conner et al. |
| 5,915,055 A | 6/1999 | Bennett et al. |
| 5,946,440 A | 8/1999 | Puetz |
| 5,970,195 A | 10/1999 | Brown |
| 6,072,932 A | 6/2000 | Bennett et al. |
| 6,104,855 A | 8/2000 | Jeon |
| 6,116,961 A | 9/2000 | Henneberger et al. |
| 6,208,796 B1 | 3/2001 | Vigliaturo |
| 6,226,111 B1 | 5/2001 | Chang et al. |
| 6,259,851 B1 | 7/2001 | Daoud |
| 6,263,136 B1 | 7/2001 | Jennings et al. |
| 6,278,831 B1 | 8/2001 | Henderson et al. |
| 6,307,998 B2 | 10/2001 | Vigliaturo |
| 6,328,608 B1 | 12/2001 | Olson et al. |
| 6,363,183 B1 | 3/2002 | Koh |
| 6,363,198 B1 | 3/2002 | Braga et al. |
| 6,370,294 B1 | 4/2002 | Pfeiffer et al. |
| 6,389,214 B1 | 5/2002 | Smith et al. |
| 6,418,262 B1 | 7/2002 | Puetz et al. |
| 6,421,493 B1 | 7/2002 | Burek et al. |
| 6,424,781 B1 | 7/2002 | Puetz et al. |
| 6,511,330 B1 | 1/2003 | Norris |
| 6,532,332 B2 | 3/2003 | Solheid et al. |
| 6,535,682 B1 | 3/2003 | Puetz et al. |
| 6,554,652 B1 | 4/2003 | Musolf et al. |
| 6,556,738 B2 | 4/2003 | Pfeiffer et al. |
| 6,556,763 B1 | 4/2003 | Puetz et al. |
| 6,571,048 B1 | 5/2003 | Bechamps et al. |
| 6,579,014 B2 | 6/2003 | Melton et al. |
| 6,591,051 B2 | 7/2003 | Solheid et al. |
| 6,599,024 B2 | 7/2003 | Zimmel |
| 6,614,953 B2 | 9/2003 | Strasser et al. |
| 6,614,979 B2 | 9/2003 | Bourdeau |
| 6,616,459 B2 | 9/2003 | Norris |
| 6,623,173 B1 | 9/2003 | Grois et al. |
| 6,632,106 B2 | 10/2003 | Musolf et al. |
| RE38,311 E | 11/2003 | Wheeler |
| 6,647,197 B1 | 11/2003 | Marrs et al. |
| 6,655,848 B2 | 12/2003 | Simmons et al. |
| 6,668,108 B1 | 12/2003 | Helkey et al. |
| 6,669,627 B1 | 12/2003 | Campbell et al. |
| 6,688,780 B2 | 2/2004 | Duran |
| 6,719,382 B2 | 4/2004 | Sucharczuk et al. |
| 6,738,555 B1 | 5/2004 | Cooke et al. |
| 6,760,531 B1 | 7/2004 | Solheid et al. |
| 6,761,594 B2 | 7/2004 | Johnsen et al. |
| 6,810,193 B1 | 10/2004 | Muller |
| 6,814,620 B1 | 11/2004 | Wu |
| 6,822,874 B1 | 11/2004 | Marler |
| 6,824,312 B2 | 11/2004 | McClellan et al. |
| 6,830,465 B2 | 12/2004 | Norris et al. |
| 6,832,035 B1 | 12/2004 | Daoud et al. |
| 6,848,952 B2 | 2/2005 | Norris |
| 6,850,685 B2 | 2/2005 | Tinucci et al. |
| 6,863,446 B2 | 3/2005 | Ngo |
| 6,867,668 B1 | 3/2005 | Dagostino et al. |
| 6,873,772 B2 | 3/2005 | Nakaya |
| 6,885,798 B2 | 4/2005 | Zimmel |
| 6,890,187 B2 | 5/2005 | Norris |
| 6,909,828 B2 | 6/2005 | Zimmel et al. |
| 6,937,807 B2 | 8/2005 | Franklin et al. |
| 6,983,095 B2 | 1/2006 | Reagan et al. |
| 6,993,237 B2 | 1/2006 | Cooke et al. |
| 7,029,322 B2 | 4/2006 | Ernst et al. |
| 7,035,510 B2 | 4/2006 | Zimmel et al. |
| 7,118,284 B2 | 10/2006 | Nakajima et al. |
| 7,121,732 B2 | 10/2006 | Pimpinella et al. |
| 7,142,764 B2 | 11/2006 | Allen et al. |
| 7,190,874 B1 | 3/2007 | Barth et al. |
| 7,194,181 B2 | 3/2007 | Holmberg et al. |
| 7,218,827 B2 | 5/2007 | Vongseng et al. |
| 7,221,832 B2 | 5/2007 | Tinucci |
| 7,228,047 B1 | 6/2007 | Szilagyi et al. |
| 7,233,731 B2 | 6/2007 | Solheid et al. |
| 7,269,319 B2 | 9/2007 | Zimmel |
| 7,270,485 B1 | 9/2007 | Robinson et al. |
| 7,277,614 B2 | 10/2007 | Cody et al. |
| 7,280,725 B2 | 10/2007 | Brown et al. |
| 7,303,220 B2 | 12/2007 | Zellak |
| 7,310,474 B2 | 12/2007 | Kanaski et al. |
| 7,333,606 B1 | 2/2008 | Swam et al. |
| 7,346,254 B2 | 3/2008 | Kramer et al. |
| 7,349,616 B1 | 3/2008 | Castonguay et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,418,181 B2 | 8/2008 | Zimmel et al. |
| 7,418,186 B2 | 8/2008 | Grubish et al. |
| 7,440,669 B2 | 10/2008 | Tinucci |
| 7,453,706 B2 | 11/2008 | Clark et al. |
| 7,470,068 B2 | 12/2008 | Kahle et al. |
| 7,485,806 B1 | 2/2009 | Gretz |
| 7,495,931 B2 | 2/2009 | Clark et al. |
| 7,499,622 B2 | 3/2009 | Castonguay et al. |
| 7,606,459 B2 | 10/2009 | Zimmel et al. |

(56) References Cited

U.S. PATENT DOCUMENTS

| | | | |
|---|---|---|---|
| 7,636,507 B2 | 12/2009 | Lu et al. |
| 7,641,396 B2 | 1/2010 | Feldner |
| 7,664,363 B1 | 2/2010 | Mowery, Sr. |
| 7,711,236 B2 | 5/2010 | Gonzalez et al. |
| 7,738,759 B2 | 6/2010 | Parikh et al. |
| 7,748,911 B2 | 7/2010 | Keenum et al. |
| 7,853,112 B2 | 12/2010 | Zimmel et al. |
| 7,885,505 B2 | 2/2011 | Zimmel |
| 7,912,336 B2 | 3/2011 | Zimmel |
| 7,933,484 B2 | 4/2011 | Hetzer et al. |
| 8,081,857 B2 | 12/2011 | Nair et al. |
| 8,172,465 B2 | 5/2012 | Kleeberger |
| 8,290,333 B2 | 10/2012 | Barlowe et al. |
| 8,346,045 B2 | 1/2013 | Zimmel et al. |
| 8,380,036 B2 | 2/2013 | Smith et al. |
| 8,573,855 B2 | 11/2013 | Nhep |
| 8,577,199 B2 | 11/2013 | Pierce et al. |
| 8,620,130 B2 | 12/2013 | Cooke et al. |
| 8,705,930 B2 | 4/2014 | Lu et al. |
| 8,737,786 B1 | 5/2014 | Compton et al. |
| 8,798,428 B2 | 8/2014 | Zimmel et al. |
| 8,824,841 B1 | 9/2014 | Mullen |
| 8,824,850 B2 | 9/2014 | Garcia et al. |
| 9,140,872 B2 | 9/2015 | Sedor et al. |
| 9,151,923 B2 | 10/2015 | Nielson et al. |
| 9,395,509 B2 | 7/2016 | Petersen et al. |
| 10,054,753 B2 | 8/2018 | Petersen |
| 10,514,520 B2 | 12/2019 | Petersen |
| 10,564,363 B1 | 2/2020 | Corl et al. |
| 10,914,909 B2* | 2/2021 | Wentworth ......... G02B 6/3878 |
| 2002/0037193 A1 | 3/2002 | Gibbons et al. |
| 2002/0062978 A1 | 5/2002 | Sakabe et al. |
| 2002/0131750 A1 | 9/2002 | Holman et al. |
| 2002/0141724 A1 | 10/2002 | Ogawa et al. |
| 2002/0181896 A1 | 12/2002 | McClellan et al. |
| 2003/0031423 A1 | 2/2003 | Zimmel |
| 2003/0031437 A1 | 2/2003 | Simmons et al. |
| 2003/0081916 A1 | 5/2003 | Norris |
| 2003/0122040 A1 | 7/2003 | Pisczak |
| 2003/0132685 A1 | 7/2003 | Sucharczuk et al. |
| 2003/0134541 A1 | 7/2003 | Johnsen et al. |
| 2003/0147597 A1 | 8/2003 | Duran |
| 2003/0169974 A1 | 9/2003 | Ngo |
| 2003/0185535 A1 | 10/2003 | Tinucci et al. |
| 2003/0202765 A1 | 10/2003 | Franklin et al. |
| 2003/0210875 A1 | 11/2003 | Wagner et al. |
| 2004/0094605 A1 | 5/2004 | Wild et al. |
| 2004/0126069 A1 | 7/2004 | Jong et al. |
| 2004/0141707 A1 | 7/2004 | Mozolowski |
| 2004/0156609 A1 | 8/2004 | Lanier et al. |
| 2004/0161970 A1 | 8/2004 | Wlos et al. |
| 2004/0184748 A1 | 9/2004 | Clatanoff et al. |
| 2004/0240826 A1 | 12/2004 | Daoud et al. |
| 2004/0266273 A1 | 12/2004 | Wu |
| 2005/0002633 A1 | 1/2005 | Solheid et al. |
| 2005/0003707 A1 | 1/2005 | Wu |
| 2005/0041926 A1 | 2/2005 | Elkins, II et al. |
| 2005/0053341 A1 | 3/2005 | Zimmel |
| 2005/0058402 A1 | 3/2005 | Ernst et al. |
| 2005/0067847 A1 | 3/2005 | Zellak |
| 2005/0105873 A1 | 5/2005 | Reagan et al. |
| 2005/0105879 A1 | 5/2005 | Kanasaki et al. |
| 2005/0111811 A1 | 5/2005 | Cooke et al. |
| 2005/0167147 A1 | 8/2005 | Marsac et al. |
| 2005/0232550 A1 | 10/2005 | Nakajima et al. |
| 2005/0232551 A1 | 10/2005 | Chang et al. |
| 2005/0232565 A1 | 10/2005 | Heggestad et al. |
| 2005/0265668 A1 | 12/2005 | Martin |
| 2005/0281526 A1 | 12/2005 | Vongseng et al. |
| 2006/0083468 A1 | 4/2006 | Kahle et al. |
| 2006/0093301 A1 | 5/2006 | Zimmel et al. |
| 2006/0120672 A1 | 6/2006 | Cody et al. |
| 2006/0153516 A1 | 7/2006 | Napiorkowski et al. |
| 2006/0169469 A1 | 8/2006 | Eastwood et al. |
| 2006/0188210 A1 | 8/2006 | Zimmel |
| 2006/0233508 A1 | 10/2006 | Mann et al. |
| 2006/0269192 A1 | 11/2006 | Hayasaka |
| 2006/0269198 A1 | 11/2006 | Blazer et al. |
| 2006/0269205 A1 | 11/2006 | Zimmel |
| 2006/0269206 A1 | 11/2006 | Zimmel |
| 2006/0285807 A1 | 12/2006 | Lu et al. |
| 2007/0036503 A1 | 2/2007 | Solheid et al. |
| 2007/0047893 A1 | 3/2007 | Kramer et al. |
| 2007/0117437 A1 | 5/2007 | Boehnlein et al. |
| 2007/0147765 A1 | 6/2007 | Gniadek et al. |
| 2007/0172172 A1 | 7/2007 | Theuerkorn et al. |
| 2007/0189692 A1 | 8/2007 | Zimmel et al. |
| 2007/0212004 A1 | 9/2007 | Lu et al. |
| 2008/0026647 A1 | 1/2008 | Boehnlein et al. |
| 2008/0063351 A1 | 3/2008 | Elkins et al. |
| 2008/0124039 A1 | 5/2008 | Gniadek et al. |
| 2008/0138020 A1 | 6/2008 | Robinson et al. |
| 2008/0138026 A1 | 6/2008 | Yow et al. |
| 2008/0164059 A1 | 7/2008 | Cipolla |
| 2008/0175541 A1 | 7/2008 | Lu et al. |
| 2008/0248673 A1 | 10/2008 | Boehnlein et al. |
| 2008/0253730 A1 | 10/2008 | Cox et al. |
| 2008/0317415 A1 | 12/2008 | Hendrickson et al. |
| 2009/0002689 A1 | 1/2009 | Cobb, III et al. |
| 2009/0022468 A1 | 1/2009 | Zimmel |
| 2009/0022469 A1 | 1/2009 | Zimmel et al. |
| 2009/0035987 A1 | 2/2009 | Daly et al. |
| 2009/0060421 A1 | 3/2009 | Parikh et al. |
| 2009/0067804 A1 | 3/2009 | Knorr et al. |
| 2009/0103881 A1 | 4/2009 | Gonzalez et al. |
| 2009/0116806 A1 | 5/2009 | Zimmel et al. |
| 2009/0196553 A1 | 8/2009 | Anderson et al. |
| 2010/0027942 A1 | 2/2010 | Smith et al. |
| 2010/0030033 A1 | 2/2010 | Farley et al. |
| 2010/0054860 A1 | 3/2010 | Thompson et al. |
| 2010/0059229 A1 | 3/2010 | Smith et al. |
| 2010/0086260 A1 | 4/2010 | Parikh et al. |
| 2010/0092136 A1 | 4/2010 | Nhep |
| 2010/0150504 A1 | 6/2010 | Allen et al. |
| 2010/0158464 A1 | 6/2010 | Zimmel et al. |
| 2010/0215331 A1 | 8/2010 | Gonzalez et al. |
| 2010/0266244 A1 | 10/2010 | Lu et al. |
| 2011/0024103 A1 | 2/2011 | Storm et al. |
| 2011/0081121 A1 | 4/2011 | Le Dissez |
| 2011/0164853 A1 | 7/2011 | Corbille et al. |
| 2011/0182558 A1 | 7/2011 | Garcia et al. |
| 2011/0229098 A1 | 9/2011 | Abernathy et al. |
| 2011/0257563 A1 | 10/2011 | Thapliyal et al. |
| 2011/0262084 A1 | 10/2011 | Ott |
| 2011/0284285 A1 | 11/2011 | Miura et al. |
| 2011/0317975 A1* | 12/2011 | Lu .................. G02B 6/3878 |
| | | 264/1.25 |
| 2012/0008909 A1 | 1/2012 | Mertesdorf et al. |
| 2012/0045178 A1 | 2/2012 | Theuerkorn |
| 2012/0186845 A1 | 7/2012 | Eshima et al. |
| 2012/0230636 A1 | 9/2012 | Blockley et al. |
| 2012/0301090 A1 | 11/2012 | Cline et al. |
| 2012/0328253 A1 | 12/2012 | Hurley et al. |
| 2013/0011105 A1 | 1/2013 | Barlowe et al. |
| 2013/0077928 A1 | 3/2013 | Hsing |
| 2013/0114937 A1 | 5/2013 | Zimmel et al. |
| 2013/0183012 A1 | 7/2013 | Cabanne Lopez et al. |
| 2013/0209042 A1 | 8/2013 | Belenky et al. |
| 2013/0209043 A1 | 8/2013 | Norris et al. |
| 2013/0294735 A1 | 11/2013 | Burris et al. |
| 2013/0330967 A1 | 12/2013 | Youtsey |
| 2014/0083229 A1 | 3/2014 | Kume |
| 2014/0093217 A1 | 4/2014 | Lu et al. |
| 2014/0126873 A1 | 5/2014 | Cooke et al. |
| 2014/0133823 A1 | 5/2014 | Simmons et al. |
| 2014/0140664 A1 | 5/2014 | Islam |
| 2014/0140671 A1 | 5/2014 | Islam |
| 2014/0219621 A1 | 8/2014 | Barnette, Jr. et al. |
| 2014/0233903 A1 | 8/2014 | Valderrabano |
| 2014/0241674 A1 | 8/2014 | Isenhour et al. |
| 2014/0248798 A1 | 9/2014 | Youtsey |
| 2015/0078720 A1* | 3/2015 | Sedor .................. G02B 6/4472 |
| | | 385/137 |
| 2015/0110442 A1 | 4/2015 | Zimmel et al. |

(56) References Cited

U.S. PATENT DOCUMENTS

| | | |
|---|---|---|
| 2015/0155697 A1 | 6/2015 | Loveless et al. |
| 2015/0168657 A1 | 6/2015 | Islam |
| 2015/0226927 A1 | 8/2015 | Islam |
| 2015/0260936 A1 | 9/2015 | Newbury et al. |
| 2015/0284036 A1 | 10/2015 | Miles |
| 2015/0370029 A1 | 12/2015 | Petersen et al. |
| 2016/0004016 A1 | 1/2016 | Zimmel et al. |
| 2016/0139355 A1 | 5/2016 | Petersen |
| 2016/0178850 A1 | 6/2016 | Nhep |
| 2016/0363733 A1 | 12/2016 | Nielson et al. |
| 2017/0102506 A1 | 4/2017 | Newbury et al. |
| 2017/0212313 A1 | 7/2017 | Elenabaas et al. |
| 2017/0269319 A1 | 9/2017 | Miller |
| 2018/0149823 A1 | 5/2018 | Wang et al. |
| 2018/0196211 A1 | 7/2018 | Agata et al. |
| 2019/0004272 A1 | 1/2019 | Field |
| 2019/0056562 A1 | 2/2019 | Petersen |

FOREIGN PATENT DOCUMENTS

| | | |
|---|---|---|
| CN | 101866034 A | 10/2010 |
| CN | 202013442 U | 10/2011 |
| CN | 202600223 U | 12/2012 |
| CN | 203909358 U | 10/2014 |
| DE | 41 30 706 A1 | 3/1993 |
| DE | 44 05 459 A1 | 8/1995 |
| DE | 202 01 170 U1 | 5/2002 |
| DE | 102 07 337 A1 | 11/2002 |
| DE | 10 2004 019 805 A1 | 11/2005 |
| DE | 20 2006 006 016 U1 | 8/2006 |
| DE | 10 2007 009 223 A1 | 8/2008 |
| EP | 0 202 994 A1 | 11/1986 |
| EP | 0 339 791 A1 | 11/1989 |
| EP | 0 355 639 A2 | 2/1990 |
| EP | 0 490 698 A1 | 6/1992 |
| EP | 0 646 811 A2 | 4/1995 |
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| EP | 1 589 361 A1 | 10/2005 |
| GB | 1129287 A | 10/1968 |
| GB | 2 215 084 A | 9/1989 |
| GB | 2 300 978 A | 11/1996 |
| JP | H01-317824 A | 12/1989 |
| JP | 2002-333547 A | 11/2002 |
| JP | 2003-98379 A | 4/2003 |
| WO | 96/36896 A1 | 11/1996 |
| WO | 00/75706 A2 | 12/2000 |
| WO | 02/39170 A2 | 5/2002 |
| WO | 02/099528 A1 | 12/2002 |
| WO | 02/103429 A2 | 12/2002 |
| WO | 03/093889 A1 | 11/2003 |
| WO | 2006/127397 A1 | 11/2006 |
| WO | 2008059212 A1 | 5/2008 |
| WO | 2010/042507 A1 | 4/2010 |
| WO | 2015/200321 A1 | 12/2015 |
| WO | 2015/200327 A1 | 12/2015 |
| WO | 2016/110245 A1 | 7/2016 |
| WO | 2016/123092 A1 | 8/2016 |
| WO | 2017/020076 A1 | 2/2017 |
| WO | 2017/161310 A1 | 9/2017 |
| WO | 2018/044729 A1 | 3/2018 |
| WO | 2018/208518 A1 | 11/2018 |

OTHER PUBLICATIONS

International Search Report and Written Opinion of the International Searching Authority for International Patent Application No. PCT/US2017/056053 dated Jan. 12, 2018, 13 pages.
Exhibit A: Fanout product by ADC Telecommunications, Inc., 2 pages, admitted as prior art as of Oct. 13, 2016.
Exhibit B: Fanout Product by ADC Telecommunications, Inc., 5 pages, admitted as prior art as of Oct. 13, 2016.
Exhibit C: Fanout Product by ADC Telecommunications, Inc., 7 pages, admitted as prior art as of Oct. 13, 2016.
Extended European Search Report for corresponding European Patent Application No. 17859670.6 dated Apr. 20, 2020, 9 pages.

* cited by examiner

FIBER OPTIC BREAKOUT TRANSITION ASSEMBLY INCORPORATING EPOXY PLUG AND CABLE STRAIN RELIEF

CROSS-REFERENCE TO RELATED APPLICATION

This application is a Continuation of U.S. patent application Ser. No. 16/341,706, filed on Apr. 12, 2019, which is a National Stage Application of PCT/US2017/056053, filed on Oct. 11, 2017, which claims the benefit of U.S. Patent Application Ser. No. 62/407,746, filed on Oct. 13, 2016, the disclosures of which are incorporated herein by reference in their entireties. To the extent appropriate, a claim of priority is made to each of the above disclosed applications.

TECHNICAL FIELD

The present disclosure relates generally to telecommunications equipment. More particularly, the present disclosure relates to fiber optic cabling and the method of making thereof.

BACKGROUND

Telecommunications equipment containing optical fibers is known. Fiber optic cables that carry a plurality of optical fibers over distances to connect to equipment are also known. In fiber optic networking, it is sometimes advantageous to bundle multiple optical fibers together into a single cable. This is often done to save space since the diameter of the actual fiber (the core and the cladding) is typically considerably smaller than the shielding (buffer and jacket) used to protect said fiber. As a result, it is possible to bundle together relatively large numbers of fibers (e.g., 12, 24, 36, 48, etc.), shielding the entire bundle and avoiding shielding each fiber individually. Such multi-fiber cables can take on many forms, including rounded cables and fiber ribbons.

Sometimes a multi-fiber bundle may carry signals directed to or from multiple pieces of equipment. Consequently, there is a need to breakout (or "furcate") individual or a series of individual optical fibers from a multi-fiber cable so that those fibers can be directed to the necessary equipment. Furcation tubing is typically used in such a fiber breakout for transitioning from a single cable with multiple fibers into individual cables with one or more fibers in each furcation cable or tubing.

One example of achieving such a breakout has been through a cable transition structure. In using such cable transitions, it is desirable to take into account the maximum bend radius of the fibers, the stress which the fibers may undergo as a result of the breakout, and how the environmental conditions may impact the fiber's performance. For the above reasons, fiber optic communication continues to need improved breakout harness designs.

SUMMARY

In one aspect, the present disclosure relates to a fiber optic cable transition assembly for transitioning a plurality of optical fibers from a multi-fiber cable to a plurality of furcation tubes. The fiber optic transition assembly has a housing with a front opening and an internal passageway that is defined by a wall and a narrow region. The housing is adapted to receive epoxy adhesive. The fiber optic transition assembly has a boot that is positioned at least partially inside the housing for receiving the multi-fiber cable to provide strain relief to the plurality of optical fibers extending therethrough. The fiber optic transition assembly has a plug supported by the boot and retained by the housing to prevent epoxy adhesive from entering the multi-fiber cable.

Another aspect of the present disclosure relates to a cable transition assembly for transitioning a plurality of optical fibers from a multi-fiber cable to a plurality of furcation tubes. The fiber optic transition assembly has a cylindrical housing with an internal passageway. The fiber optic transition assembly also has a first boot that is positioned at least partially inside the housing for supporting the multi-fiber cable. The first boot supports a first plug that is secured with respect to said cylindrical housing internal passageway. The fiber optic transition assembly also has a second boot that is positioned at least partially inside the housing and supports the plurality of furcation tubes. The second boot supports a second plug that is secured with respect to said cylindrical housing internal passageway.

A further aspect of the present disclosure relates to a fiber optic cable transition assembly for transitioning a plurality of optical fibers from a multi-fiber cable to a plurality of furcation tubes. The fiber optic transition assembly has a cylindrical housing with an internal passageway defined by a wall. The housing includes an epoxy injection port. The fiber optic transition assembly has a first boot that is positioned at least partially inside the housing and supports the multi-fiber cable to provide strain relief to the plurality of optical fibers extending therethrough. The fiber optic transition assembly has a first plug that is supported by the first boot and forms a seal within the housing internal passageway wall. The fiber optic transition assembly has a second boot that is positioned at least partially inside the housing and supports the plurality of furcation tubes and provides strain relief to the plurality of optical fibers extending therethrough. The fiber optic transition assembly has a second plug that is supported by the second boot and forms a seal within the housing internal passageway wall. The fiber optic transition assembly has a volume of hardened epoxy that is contained within the housing internal passageway between the first plug and the second plug.

DESCRIPTION OF EXAMPLE EMBODIMENTS

Figure 1:
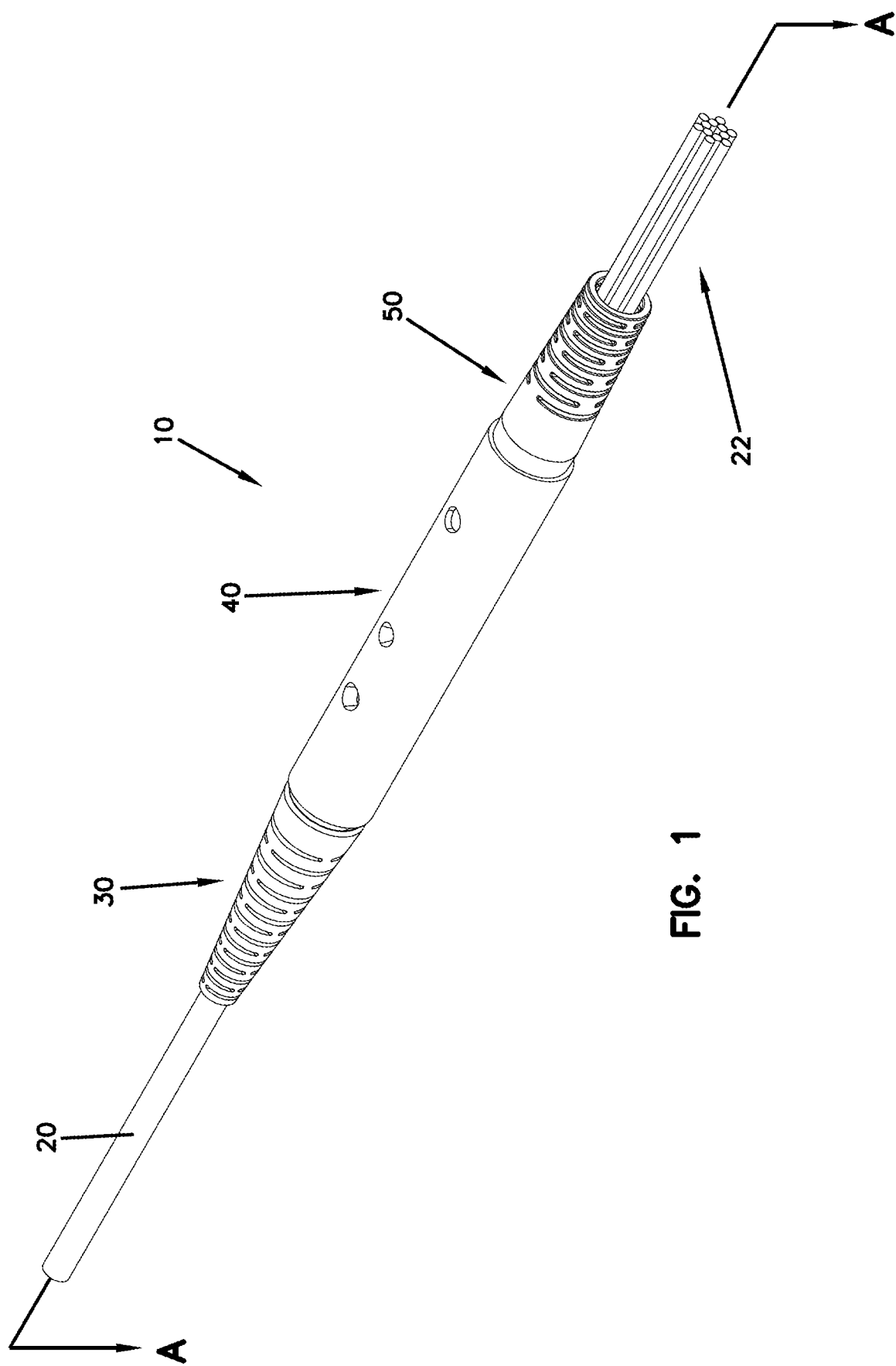
FIG. 1 is a perspective view of a fiber optic breakout transition assembly breaking optical fibers within a multi-fiber cable into multiple furcation tubes according to an example embodiment of the present disclosure.

FIG. 1 illustrates an example fiber optic cable transition assembly 10 for transitioning a plurality of optical fibers 24 (FIGS. 2, 8, 13) from a multi-fiber cable 20 to a plurality of furcation tubes 22. The illustrated fiber optic transition assembly 10 includes a housing 40, a rear strain-relief boot 30 and a front strain-relief boot 50.

Figure 2:
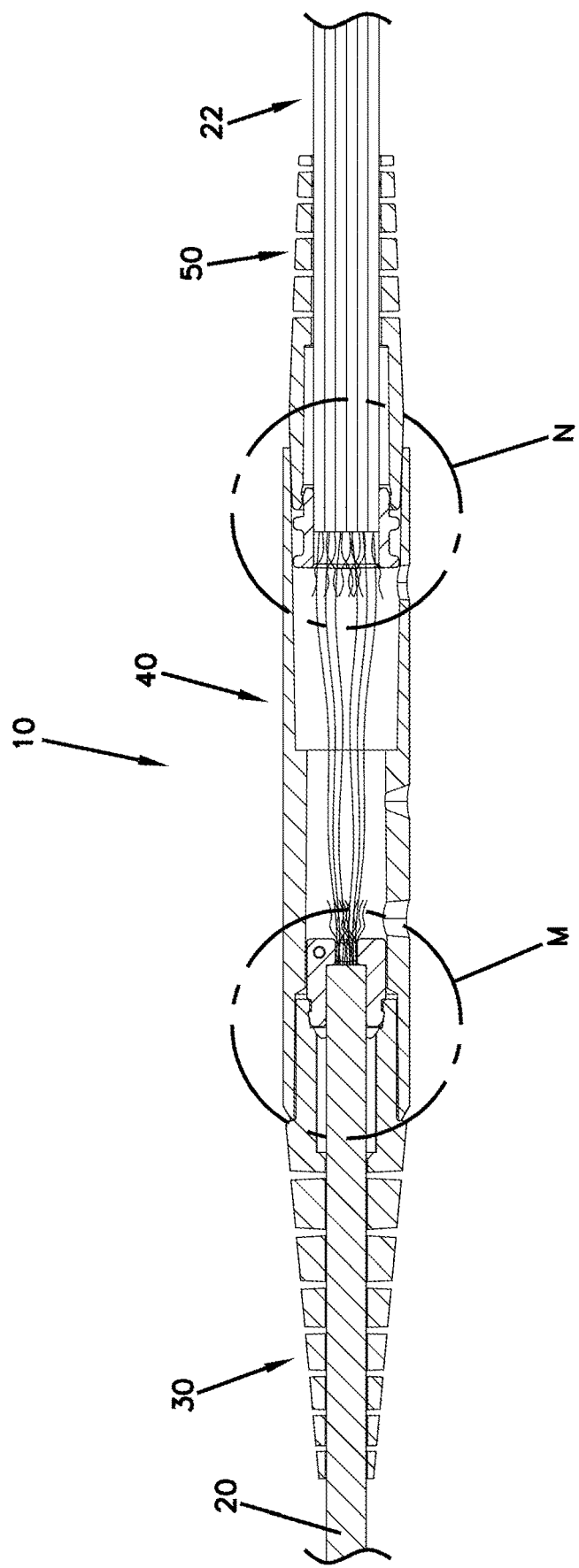
FIG. 2 is a side cross-sectional view of the fiber optic breakout transition assembly illustrated in FIG. 1, as viewed along sight line A.

FIG. 2 illustrates a cross-sectional illustration of the multi-fiber cable 20 inserted into the fiber optic transition assembly 10 through the rear strain-relief boot 30. The illustrated rear strain-relief boot 30 supports a plug 60 that is received within the housing 40. As illustrated, the multi-fiber cable 20 is inserted within, and is secured by, the plug 60 in the rear strain-relief boot 30. The multi-fiber cable 20 can have elastomeric properties and provide flexibility to the optical fibers 24 and strength members 26 (FIGS. 8, 13) therein. The outer jacket of the multi-fiber cable 20 is stripped to reveal the optical fibers 24, which can be coated with a polymer such as polyimide, and any strength members 26 such as aramid yarn extending within. The illustrated front strain-relief boot 50 supports a plug 70 that is received within the housing 40. As illustrated, the plurality of furcation tubes 22 are inserted within, and are secured by, the plug 70 in the front strain-relief boot 50. The optical fibers 24 and strength members 26 are inserted into the plurality of furcation tubes 22, which exit the fiber optic cable transition assembly 10 through the front strain-relief boot 50. The furcation tubes 22 can have elastomeric properties and provide flexibility to the optical fibers 24 and strength members 26 therein.

Figure 3:
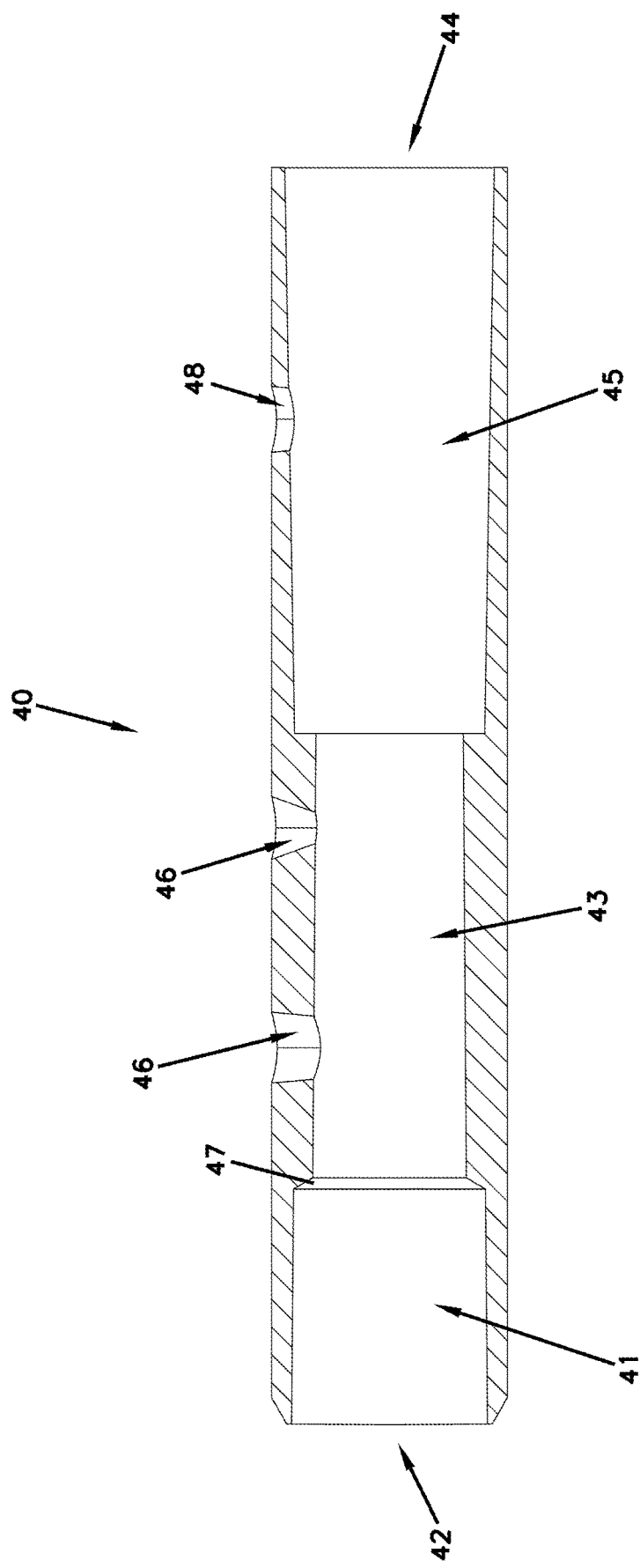
FIG. 3 is an isolated side cross-sectional view of the transition housing illustrated in FIGS. 1-2, shown isolated from the assembly.

FIG. 3 illustrates a cross-sectional view of the example housing 40. The illustrated housing 40 is preferably made of a rigid structure such as plastic. As illustrated, the housing 40 is defined by a rear end 42 and a front end 44. As illustrated in FIG. 1, the housing 40 can be defined by a cylindrical geometry having a circumferential outer wall extending between the rear end 42 and the front end 44. Preferably, the circumferential outer wall of the housing 40 is defined by a diameter that allows the housing and transition assembly 10 to be pulled, pushed and/or blown through cabling conduit or existing and/or fabricated structural holes supporting installation of fiber cables.

An illustrated internal passageway extends within the housing 40 between the rear end 42 and the front end 44. This internal passageway is defined by a rear receiver 41 (or cavity), a narrow channel 43 and a front receiver 44 (or cavity) and allows for the optical fibers 24 (FIG. 2) to pass therethrough from the multi-fiber cable 20 (FIGS. 1 & 2) to the broken-out furcation tubes 22 (FIG. 2). The rear receiver 41 can be defined by a consistent clearance, for example a consistent diameter, extending from an opening at the rear end 42 to the narrow channel 43. The rear receiver 41 can alternatively be defined by a clearance, for example a diameter, that narrows or tapers from the rear end 42 to the narrow channel 43 This clearance of the rear receiver 41 can define any diameter or geometry that allows the rear strain-relief boot 30 to be inserted therein. The rear receiver 41 can also define a transition surface 47, such as a chamfer, from the consistent clearance to the narrow channel 43, for example if the clearance of the rear receiver is greater than a clearance of the narrow channel.

The narrow channel 43 illustrates a narrower clearance, for example diameter, than the rear receiver 41 and the front receiver 45. This clearance of the narrow channel 43 can define any diameter or geometry that allows the plug 60 to be inserted therein. The clearance of the narrow channel 43 can be consistent between the rear receiver 41 and the front receiver 45. The front receiver 45 extends from an opening at the front end 44 to the narrow channel 43. The illustrated front receiver 45 can be defined by a clearance, for example a diameter, that narrows or tapers from the front end 44 to the narrow channel 43. This clearance of the front receiver 45 can define any diameter or geometry that allows the front strain-relief boot 50 to be inserted therein. As illustrated, for example, the narrowest clearance of the front receiver 45 is wider than the clearance of the narrow channel 43.

The illustrated housing 40 can include up to three apertures, for example at least one adhesive epoxy fill aperture and at least one vent aperture. For example, the illustrated housing can include a pair of adhesive epoxy fill apertures 46 extending through the outer wall relative to the narrow channel 43, and one further vent aperture 48 relative to the front receiver 45, to allow adhesive epoxy (not shown) to be inserted into the internal passageway od the housing. It is contemplated that the location and number of these adhesive fill and vent apertures can vary from that illustrated.

The rear receiver 41 receives (FIGS. 2 & 3) the rear strain-relief boot 30 therein and the plug 60, which is supported by the rear strain-relief boot 30, is received, for example with a friction fit, by the narrow channel 43. When assembled, as illustrated in FIG. 2, the plug 60 forms a seal with the narrow channel 43 to prevent any adhesive epoxy (not shown) injected within from exiting through the rear receiver 41.

Figure 4:
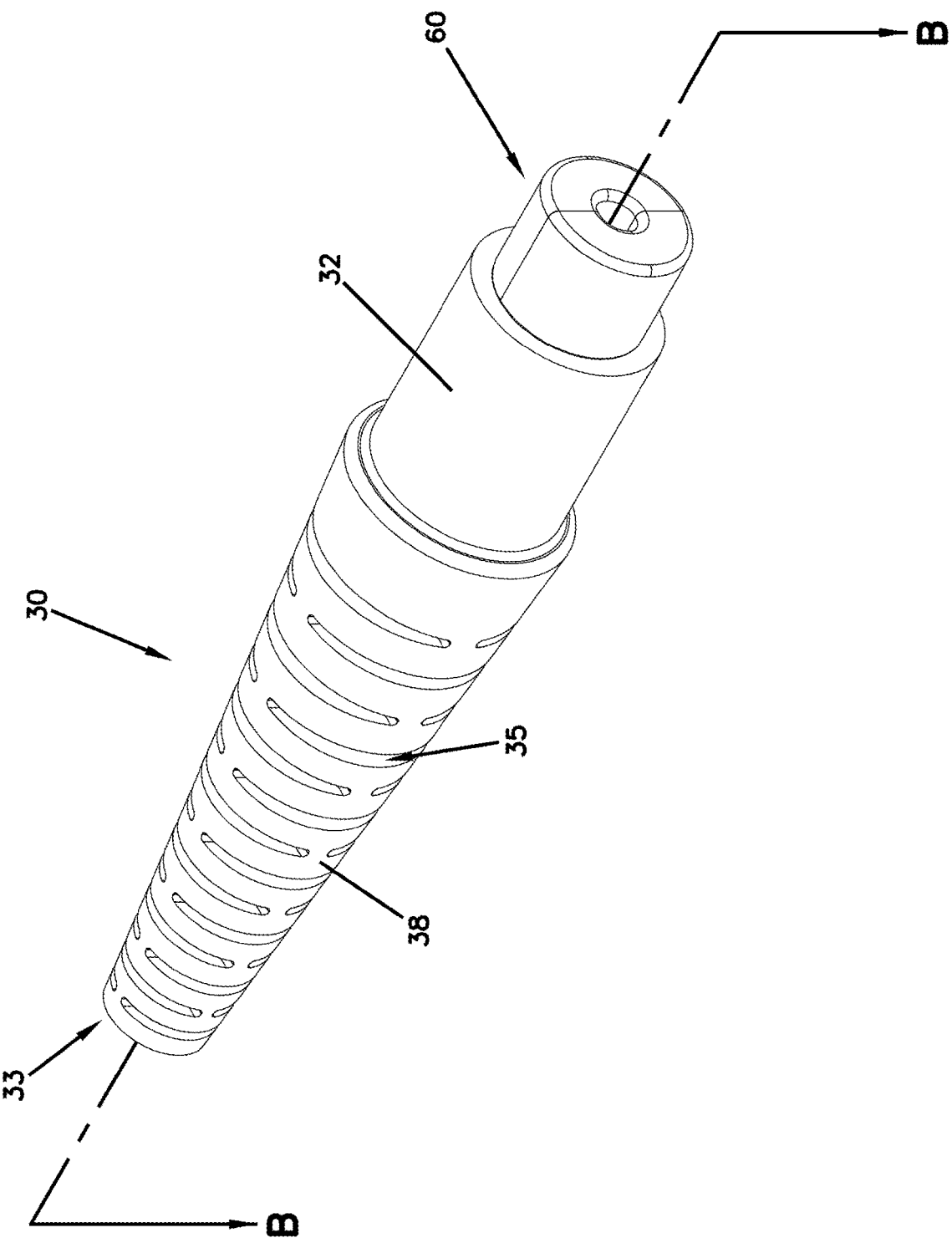
FIG. 4 is a perspective view of the rear strain-relief boot illustrated in FIGS. 1-2, shown isolated from the assembly and illustrating a rear plug received within.
Figure 5:
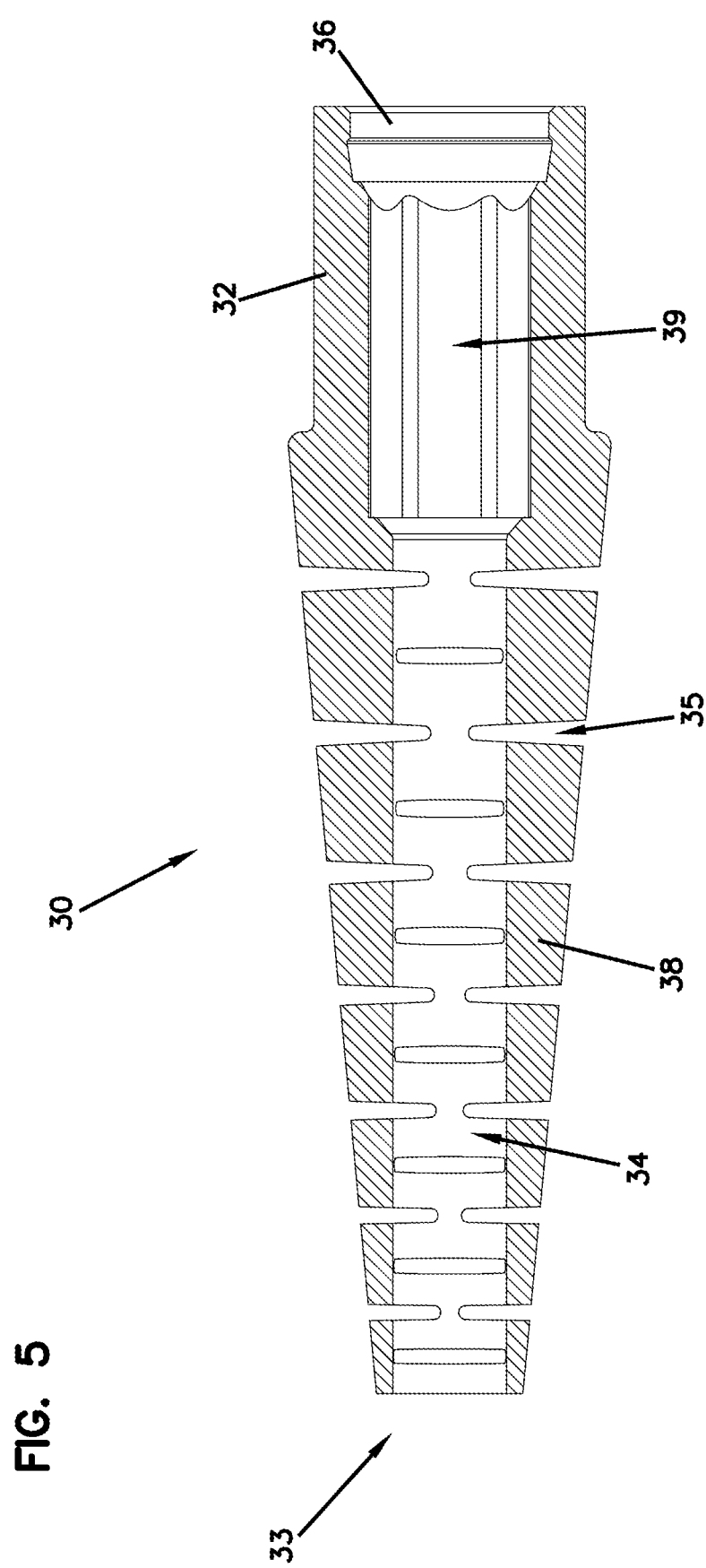
FIG. 5 is a side cross-sectional view of the rear strain-relief boot illustrated in FIG. 4, as viewed along sight line B, shown isolated from the rear plug.

As illustrated in FIGS. 4-5, the rear strain-relief boot 30 defines a strain-relief body 38 and a mounting flange 32. The rear strain-relief boot 30 is preferably made of some elastomeric material such as, but not limited to, rubber or silicone. The strain-relief body 38 can taper in width, for example diameter, between the mounting flange 32, for example a collar, and a distal end 33. The strain-relief body 38 can be flexible through a plurality of flex features 35, such as notch cutouts, positioned between the mounting flange 32 and the distal end 33. The mounting flange 32 is narrower than the widest part of the strain-relief body 38. The mounting flange 32 can have an outer surface that inserts into the rear receiver 41 of the housing 40 (FIGS. 2 & 3). The widest part of the strain-relief body 38 is wider than the opening of the rear receiver 41, and thus controls the distance into which the mounting flange 32 extends within the rear receiver.

As particularly illustrated in FIG. 5, the strain-relief body 38 includes a passageway 34 extending from the distal end 33 through the mounting flange 32 to allow the multi-fiber cable 20 (FIGS. 1 & 2) to extend therethrough. The mounting flange 32 includes a hollow interior section 39 (or cavity) defined by a coupling element 36, for example a circumferential mouth. As illustrated, the coupling element 36 can be defined by at least two different geometries having different widths which allow for the plug 60 to be securely received therein.

Figure 6:
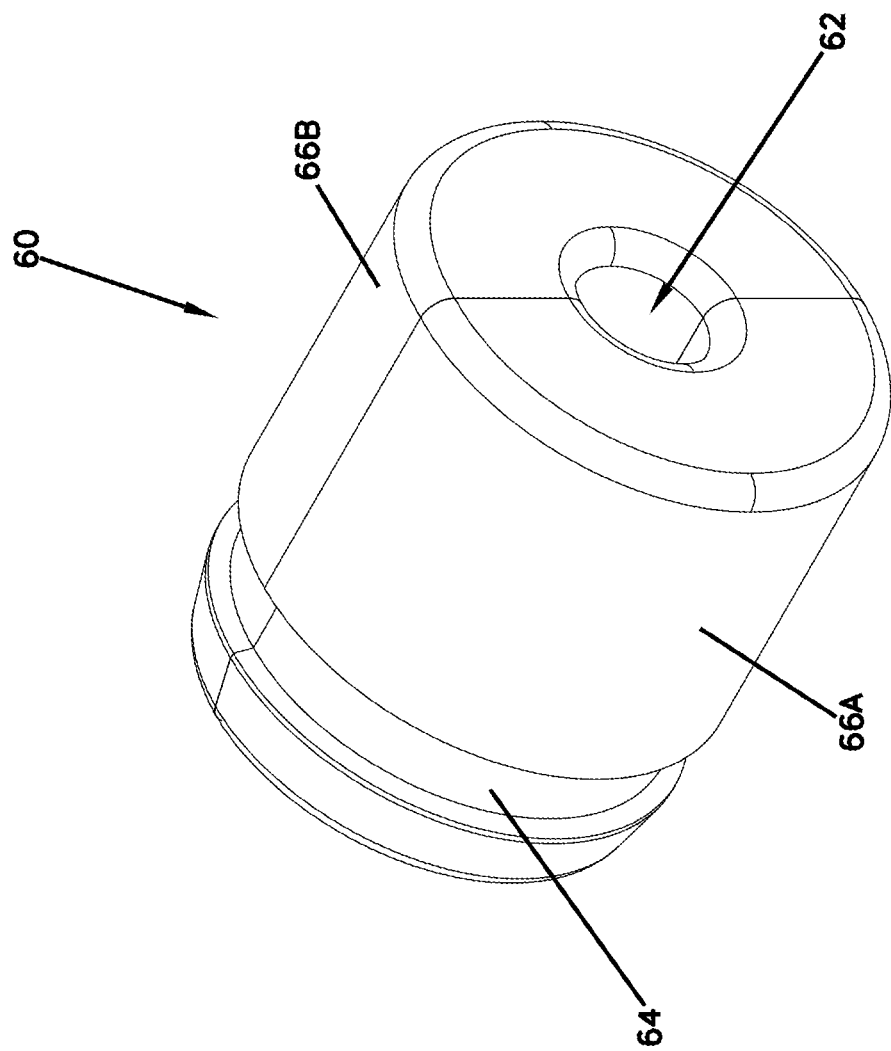
FIG. 6 is an isolated perspective view of the rear plug illustrated in FIG. 4.

As illustrated in FIG. 6, the plug 60 defines an internal passageway 62 to partially receive the multi-fiber cable 20 therein (FIG. 2). Preferably, the internal passageway 62 has a clearance, for example a diameter, which snugly receives a tip of the multi-fiber cable 20, for example through a friction fit, and prevents adhesive epoxy inserted into the narrow channel 43 from travelling through the internal passageway. The plug 60 can define an outer geometry, for example a circumferential outer surface, which is frictionally received within the narrow channel 43 of the housing 40. For example, the plug 60 can have a geometry that is slightly wider than the narrow channel 43 in order to achieve a snug fit therein. The plug 60 can be of a material that is generally rigid with has a slight deformability to allow it to compress past the transition surface 47 and into the narrow channel 43 of the housing 40.

The plug 60 further includes a coupling feature 64 which correspondingly couples to the coupling element 36 in the rear strain-relief boot 30 (FIGS. 2 & 5). For example, the coupling feature 64 on the plug 60 can have a geometry, for example two different widths, that corresponds with the geometry of the coupling element 36 in the strain-relief boot 30 in order to provide a snap-on fit when inserted into the mouth of the mounting flange 32.

Figure 7:
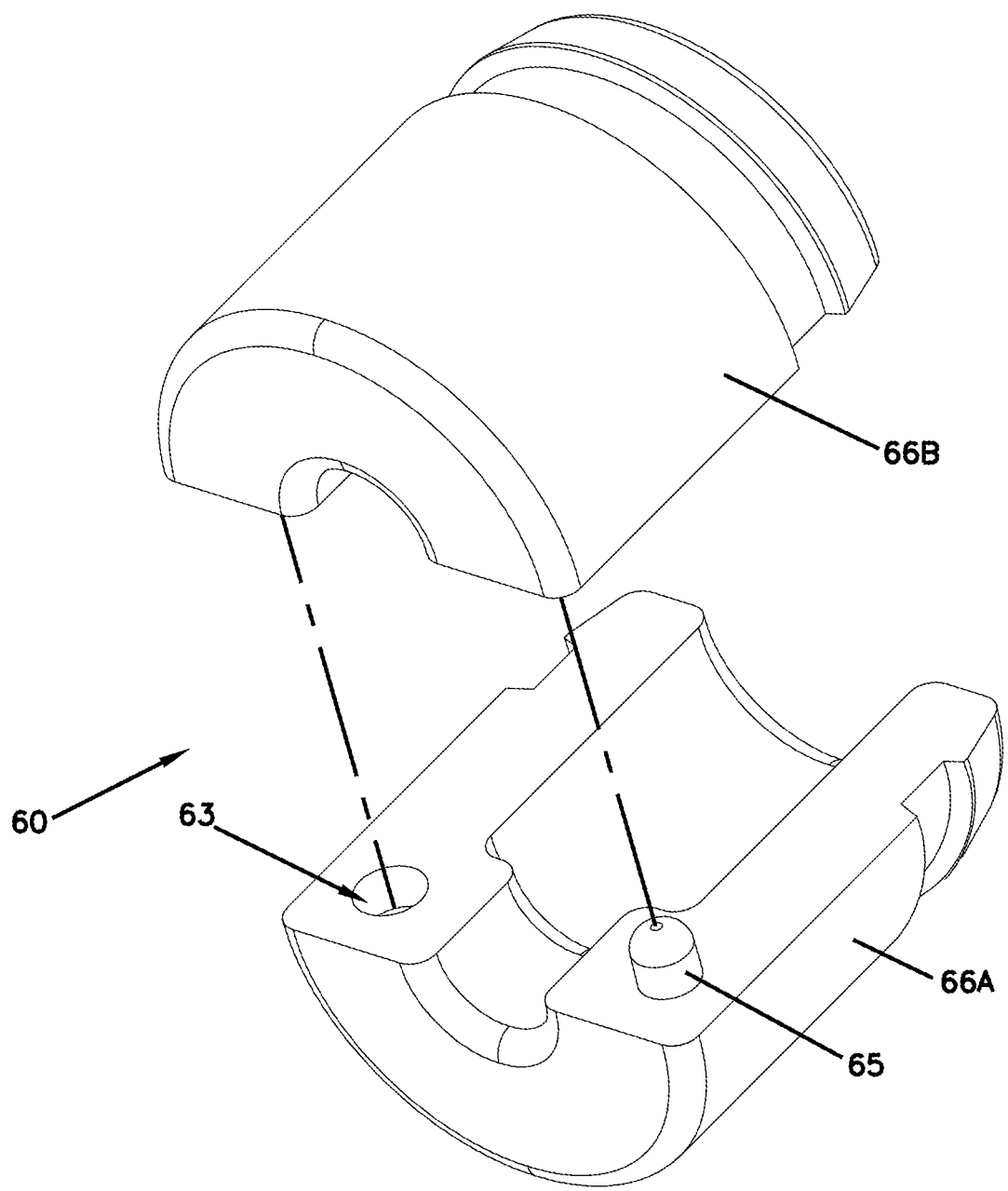
FIG. 7 is an exploded perspective view of the rear plug illustrated in FIG. 6, showing the example plug broken into two sections.

As illustrated in FIGS. 6-7, the plug 60 can be formed by more than one, preferably a pair of, separable sections 66a, 66b (arms or halves). These separable sections 66a, 66b can be opposingly symmetrical as illustrated. These separable sections 66a, 66b can be separably secured to each other through mounting features, for example a pair of operably opposing male inserts 65 and female receivers 63. These separable sections 66a, 66b remain aligned together by the resistive force applied by the coupling element 36 in the rear strain-relief boot 30 and the narrow channel 43 of the housing 40, once inserted therein.

In use, the separable sections 66a, 66b of the plug 60 are placed around the tip of the multi-fiber cable 20 (FIGS. 1-2) and the optical fibers 24 (FIG. 2) that extend therefrom, so that the cable and fibers are snugly contained within the internal passageway 62 once the separable sections are aligned. These optical fibers 24 extend through the narrow channel 43 and toward the front strain-relief boot 50.

Figure 8:
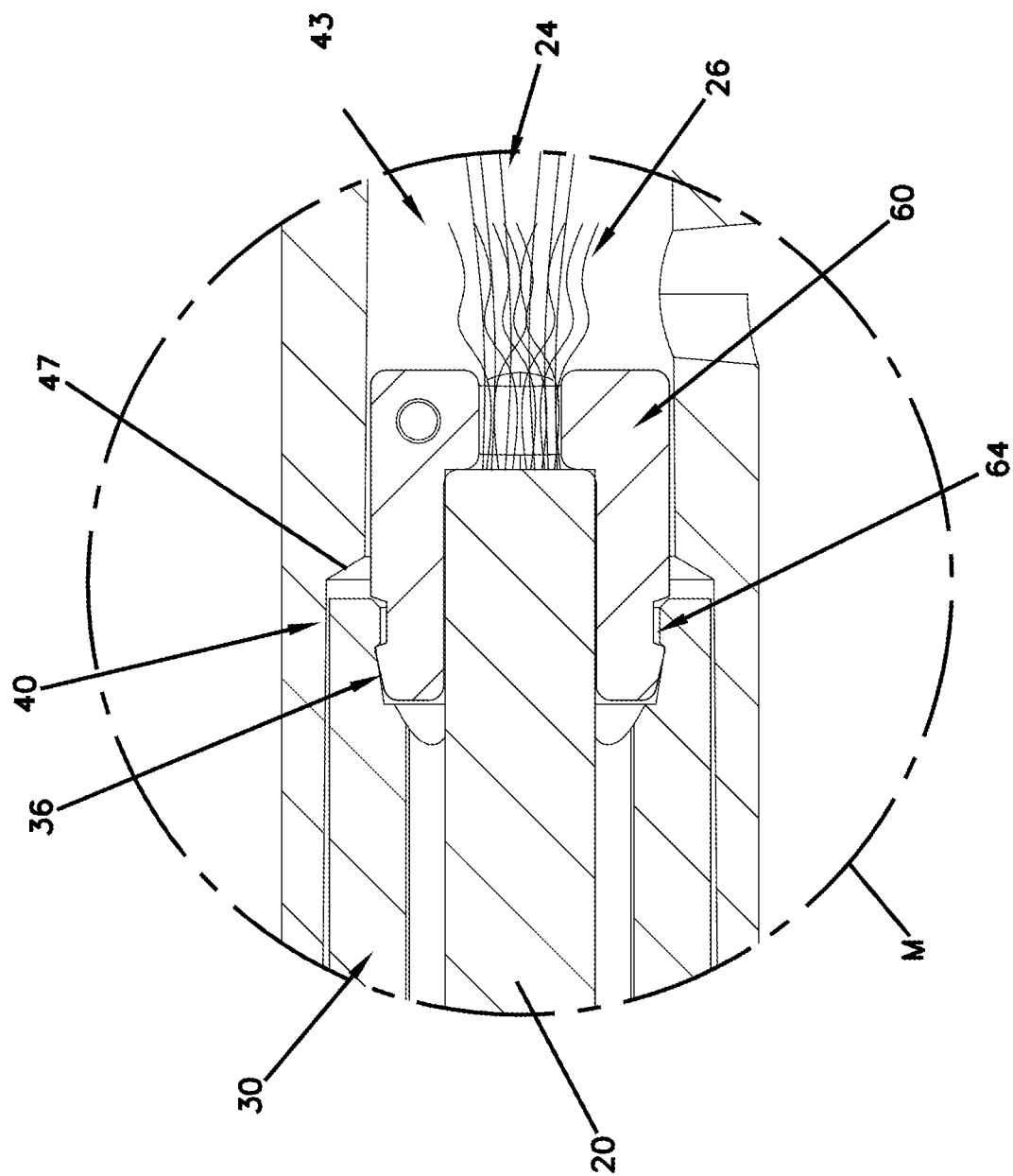
FIG. 8 is an enlarged cross-sectional view of the interconnection of the housing, rear strain-relief boot and rear plug, identified in window M in FIG. 2.

FIG. 8 illustrates an enlarged view of the interconnection of the rear strain-relief boot 30, the rear plug 60 and the housing 40 as the multi-fiber cable 20 and optical fibers 24 and strength members 26 extend therethrough. As illustrated, the rear strain-relief boot 30 snugly inserts into the housing 40. The coupling element 36 (FIG. 5) of the rear strain-relief boot 30 fastens to, for example through a snap-on fit, the coupling element 64 (FIG. 6) of the rear boot 64. As further illustrated, rear plug 60 inserts past the transition surface 47 into the narrow channel 43 of the housing 40 to sealingly engage the inner passageway wall.

The front receiver 45 of the housing 40 receives (FIGS. 2 & 3) the front strain-relief boot 50 and the plug 70, which is supported by the front strain-relief boot, therein.

Figure 9:
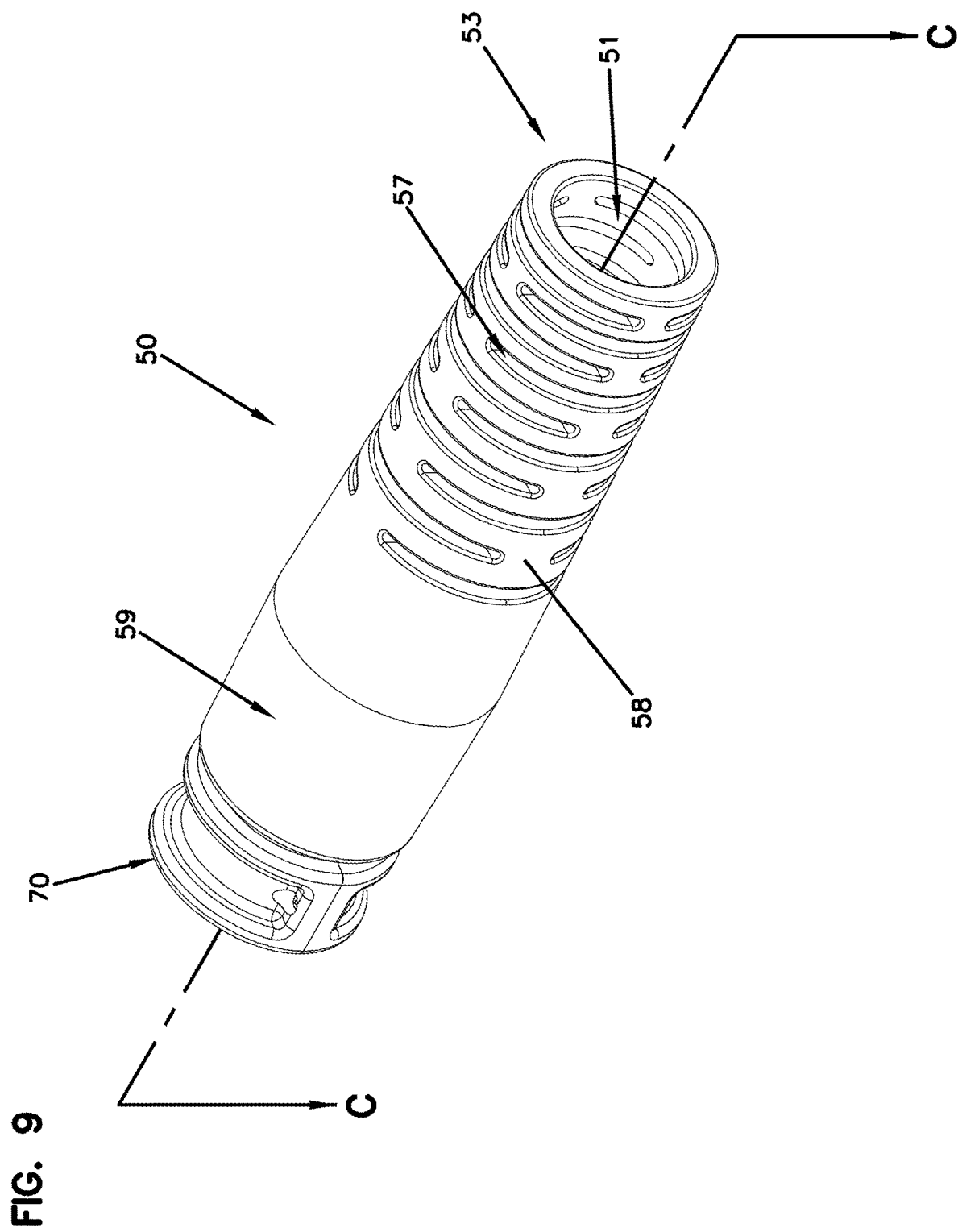
FIG. 9 is a perspective view of the front strain-relief boot illustrated in FIGS. 1-2, shown isolated from the assembly and illustrating a front plug received within.
Figure 10:
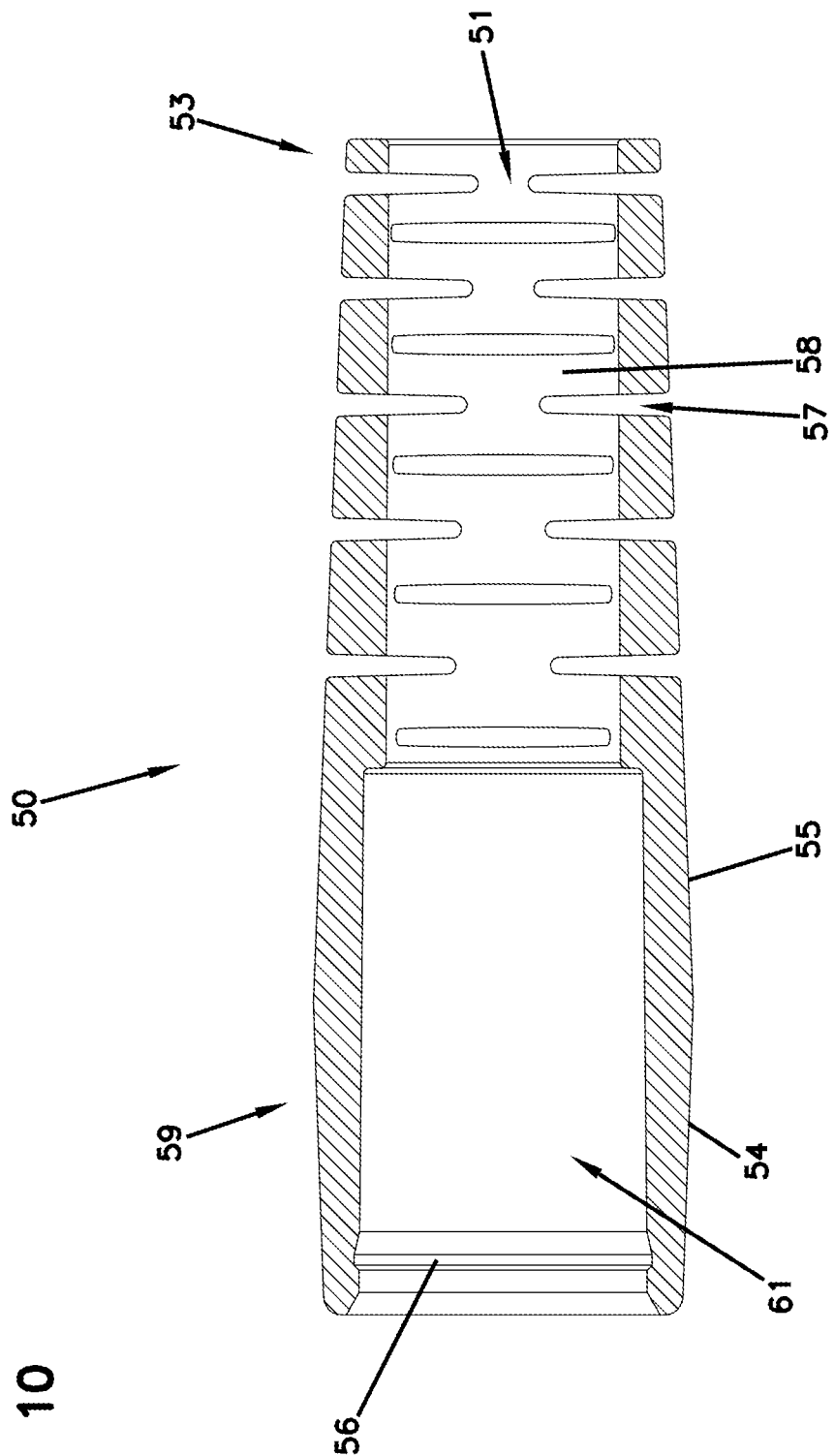
FIG. 10 is a side cross-sectional view of the front strain-relief boot illustrated in FIG. 9 as viewed along sight line C, shown isolated from the front plug.

As illustrated in FIGS. 9-10, the front strain-relief boot 50 includes a strain-relief body 58 and mounting collar 59, for example a flange. The rear strain-relief boot 50 is preferably made of some elastomeric material such as, but not limited to, rubber or silicone. The front strain-relief body 58 can taper in width, for example diameter, between the mounting collar 59 and a distal end 53. The front strain-relief body 58 can be flexible through a plurality of notch cutouts 57 positioned between the mounting collar 59 and the distal end 53. The mounting collar 59 can have an outer surface that inserts into the front receiver 45 of the housing 40 (FIGS. 2 & 3). As illustrated, the outer surface of the mounting collar 59 can have a geometry defining tapering widths, for example diameters. As illustrated, the outer surface of the mounting collar 59 can define a first section 54 of increasing/expanding width and a second section 55 of decreasing/narrowing width in a direction toward the distal end 53. The widest point of the mounting collar 59 outer surface, preferably between the first 54 and second 55 sections is wider than the narrowest section of the tapering front receiver 45 of the housing 40, and thus controls the distance into which the connection flange extends within the front receiver. Thus, the mounting collar 59 can secure within the front receiver 45 with a friction fit.

As particularly illustrated in FIG. 10, the front strain-relief body 58 includes a passageway 51 extending from the distal end 53 through the mounting collar 59 to allow the optical fibers 24 and furcation tubes 22 (FIG. 2) extending from the multi-fiber cable 20 (FIGS. 1 & 2) to extend therethrough. The mounting collar 59 includes a hollow interior section 61 (or cavity), similar to the mounting flange 32 above, defined by a coupling element 56, for example a circumferential mouth. As illustrated, the coupling element 56 can be defined by at least two different geometries having different widths which allow for the plug 70 to be securely received therein.

Figure 11:
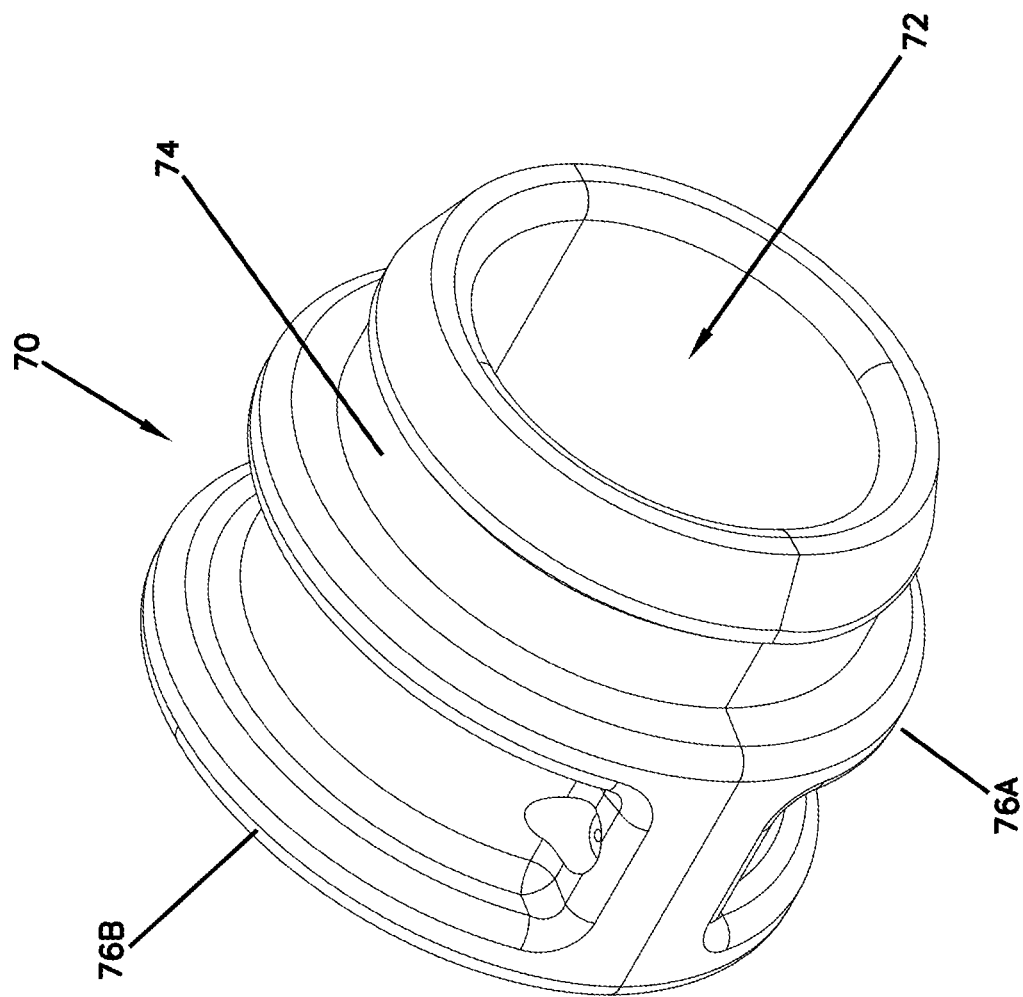
FIG. 11 is an isolated perspective view of the front plug illustrated in FIG. 9.

As illustrated in FIG. 11, the plug 70 defines an internal passageway 72 to partially receive the optical fibers 24 (FIG. 2) extending through the housing 40 from the multi-fiber cable 20 (FIGS. 1 & 2). The plug 70 can define an outer geometry which is frictionally received within the front receiver 45 of the housing 40. For example, the plug 70 can have an outer geometry that is slightly wider than a section of the tapering front receiver 45 in order to achieve a snug fit therein. The plug 70 can be of a material that is generally rigid but has a slight deformability to allow it to compress into the front receiver 45 of the housing 40.

The plug 70 further includes a coupling feature 74 which correspondingly couples to the coupling element 56 in the front strain-relief boot 50 (FIGS. 2 & 9). For example, the coupling feature 74 on the plug 70 can have a geometry, for example two different widths, that corresponds with the geometry of the coupling element 56 in the front strain-relief boot 50 in order to provide a snap-on fit when inserted into the mouth of the mounting collar 59.

Figure 12:
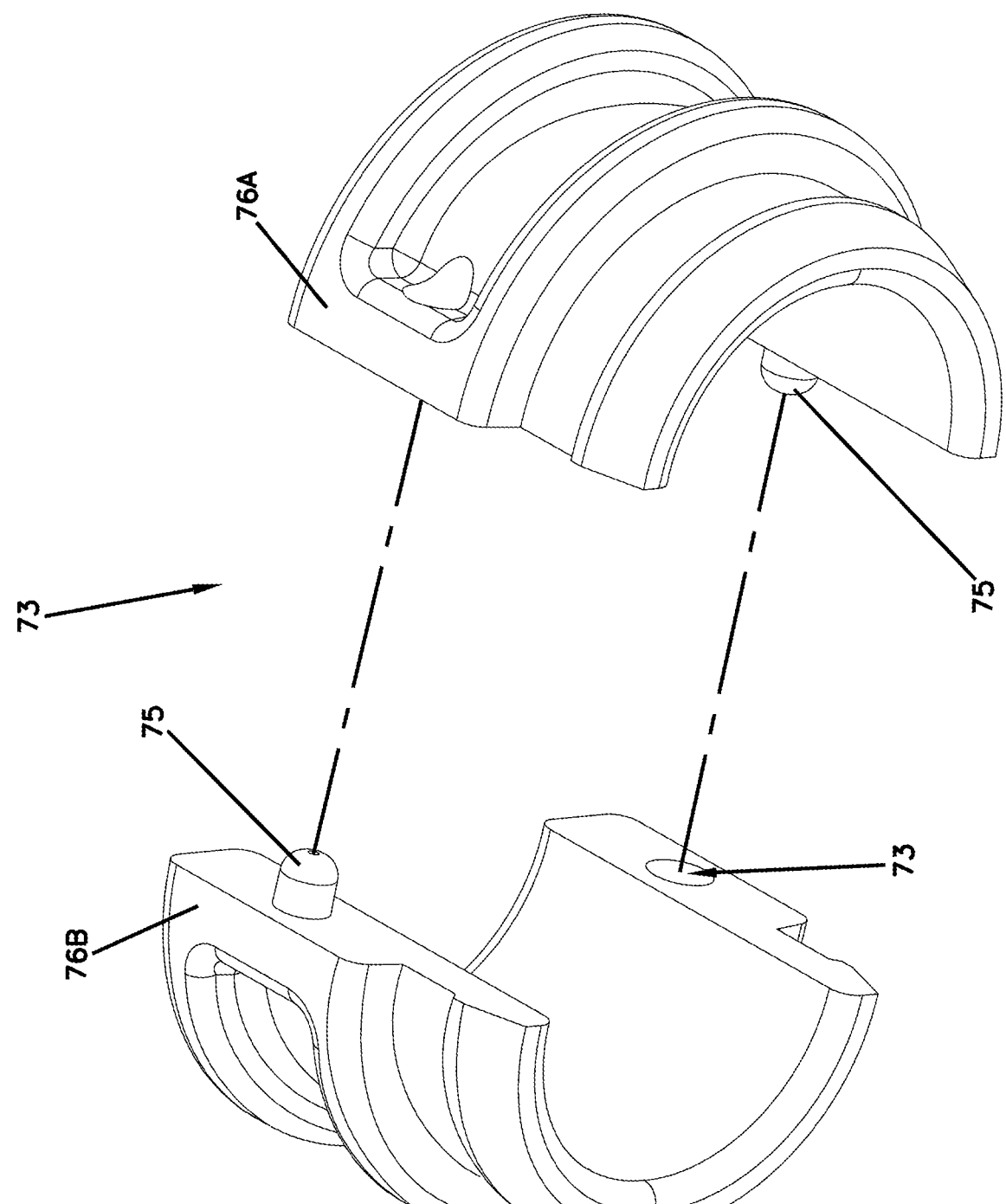
FIG. 12 is an exploded perspective view of the front plug illustrated in FIG. 11, showing the example plug broken into two sections.

As illustrated in FIGS. 11-12, the plug 70 can be formed by more than one, preferably a pair of, separable sections 76a, 76b (arms or halves). These separable sections 76a, 76b can be opposingly symmetrical as illustrated. These separable sections 76a, 76b can be separably secured to each other through mounting features, for example a pair of operationally opposing male inserts 75 and female receivers 73. These separable sections 76a, 76b remain aligned together by the resistive force applied by the coupling element 56 in the front strain-relief boot 50 and the front receiver 45 of the housing 40, once inserted therein. In use, the separable sections 76a, 76b of the plug 70 are placed around the optical fibers 24 (FIG. 2) extending from the multi-fiber cable 20 (FIGS. 1 & 2), so that the fibers are snugly contained within the internal passageway 72 once the separable sections are aligned.

Figure 13:
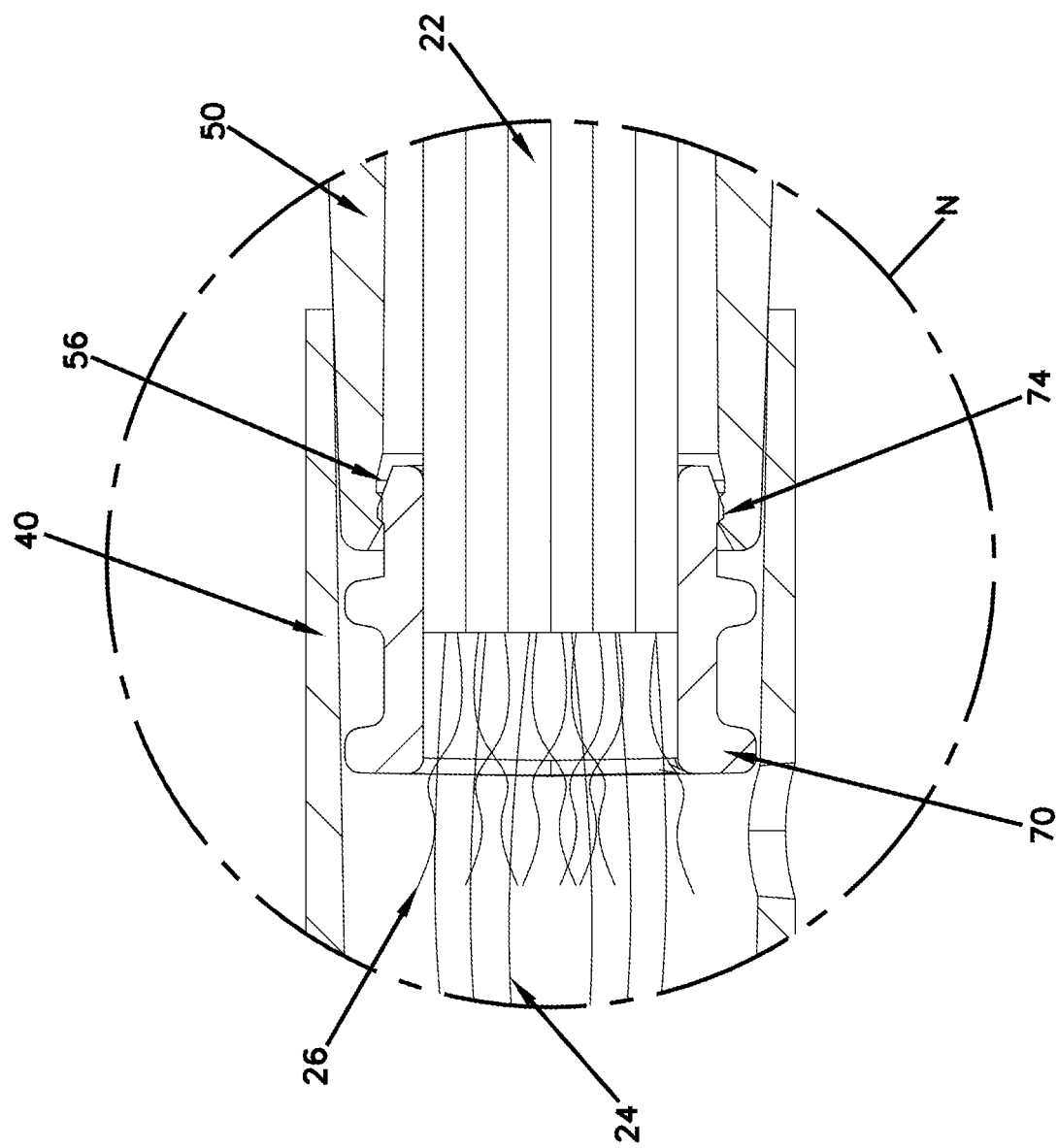
FIG. 13 is an enlarged cross-sectional view of the interconnection of the housing, front strain-relief boot and front plug, identified in window N in FIG. 2.

FIG. 13 illustrates an enlarged view of the interconnection of the front strain-relief boot 50, the front plug 70 and the housing 40 as the furcation tubes 22, optical fibers 24 and strength members 26 extend therethrough. As illustrated, the front strain-relief boot 50 snugly inserts into the housing 40. The coupling element 56 (FIG. 10) of the front strain-relief boot 50 fastens to, for example through a snap-on fit, the coupling element 74 (FIG. 11) of the front plug 70. As further illustrated, front plug 70 sealingly engages the inner passageway wall of the housing 40.

When the transition assembly 10 is assembled, as illustrated in FIGS. 1-2, the plugs 60, 70 form a seal within the housing 40 on either side of a length-wise axis of the narrow channel 43 (FIG. 3). Further, the optical fibers 24 and strength members 26 extend within the narrow channel 43 from one plug 60 to the other plug 70. Adhesive epoxy (not shown) is then injected into the internal passageway of the housing 40 through the adhesive epoxy fill apertures 46. As the internal passageway of the housing 40 fills with adhesive epoxy, an excess air and/or epoxy exits the housing through the venting aperture 48. The adhesive epoxy is then allowed to harden around the optical fibers 24 and strength members 26.

The adhesive epoxy used can be any suitable adhesive that can transition from a fluid state to a rigid hardened state over a period of some time. For example, the adhesive may be an epoxy-like substance which cures over a period of several minutes after injection. For example, the adhesive epoxy can be an ultra-violet reactive substance which hardens under an ultra-violet light source. In this embodiment, the transition assembly would require a means to allow the ultra-violet rays to reach the adhesive. For example, the housing 40 can be made of clear or a semi-clear plastic. Alternatively, using the multiple apertures 46, 48 in the housing 40, multiple different adhesive epoxies can be injected so that they react upon contacting each other.

Once hardened, the adhesive ensures that the furcation tubes 22 are linked to the multi-fiber cable 20 via a rigid structure. As a result, stress placed on the multi-fiber cable 20 and furcation tubes 22 is transferred directly to the furcation tubes and multi-fiber cable via the hardened adhesive without being transferred to the optical fibers 24. In addition, in embodiments where the strength members 26, such as aramid yarn, are present in the furcation tubes 22 and/or the multi-fiber cable 20, these strength members provide further structural elements which may be linked by way of the cured adhesive. These configurations may further decrease the likelihood of having forces placed on the multi-fiber cable 20 and furcation tubes 22 being transferred to the fibers 24 and strength members 26 within the transition.

Furthermore, when assembled, the elastomeric nature of the front boot 50 can provide improved optical performance when a bending load is applied to the furcation tubes 22. For example, when applying a load at 90 degrees relative to the transition assembly 10, the boot 50 contours to a slight radius instead of allowing the furcation tubes 22 to bend abruptly at 90 degrees. This helps to reduce stresses on the fibers 24 and strength members 26 and thereby improve optical performance when bending and applying a load to the furcation tubes 22. In one embodiment, the stress on the fibers 24 and strength members 26 is reduced and thereby optical performance is improved when a bending load is applied to the furcation tubes 22 between 90 degree and 135 degrees relative to the length-wise axis of the transition assembly 10. Without the plugs 60, 70 leaking adhesive epoxy can travel into, and harden within, the multi-fiber cable 20 and furcation tubes 22, thus reducing or preventing the ability for the multi-fiber cable and furcation tubes to flex. The plugs 60, 70 thus prevent adhesive epoxy from exiting the internal passageway of the housing 40 into the multi-fiber cable 20 and the furcation tubes 22, thus maintaining their elastomeric nature.

The present embodiment also relates to a fiber optic cable transition assembly and method for transitioning a plurality of optical fibers from a multi-fiber cable to a plurality of furcation tubes. The fiber optic transition assembly includes a cylindrical housing with an internal passageway defined by a wall. The housing includes a flowable fixation material injection port. The fiber optic transition assembly includes a first boot being positioned at least partially inside the housing and supporting the multi-fiber cable for providing strain relief to the plurality of optical fibers extending therethrough. The fiber optic transition assembly includes a first plug supported by the first boot and forming a seal within the housing internal passageway wall. The fiber optic transition assembly includes a volume of flowable fixation material which is cured, dried, and/or hardened and contained within the housing internal passageway between the first plug and a second end of the housing.

The present embodiment also relates to a fiber optic cable transition assembly and method for transitioning a plurality of optical fibers from a multi-fiber cable to a plurality of furcation tubes with the above features. The fiber optic transition assembly includes a second boot being positioned at least partially inside the housing and supporting the plurality of furcation tubes for providing strain relief to the plurality of optical fibers extending therethrough. The fiber optic transition assembly includes a second plug supported by the second boot and forming a seal within the housing internal passageway wall. The fiber optic transition assembly includes a volume of flowable fixation material which is cured, dried, and/or hardened and contained within the housing internal passageway between the first plug and the second plug.

The present embodiment also relates to a fiber optic cable transition assembly and method for transitioning a plurality of optical fibers from a multi-fiber cable to a plurality of furcation tubes. The fiber optic transition assembly includes an elongated housing with a first end opening, an opposite end opening and an internal passageway. The housing is adapted to receive a flowable fixation material, such as epoxy adhesive. The fiber optic transition assembly includes a boot being positioned at least partially inside the housing and receiving either the multi-fiber cable to provide strain relief to the plurality of optical fibers extending therethrough, or the plurality of furcation tubes. The fiber optic transition assembly includes a plug supported by the boot and retained by the housing to prevent epoxy adhesive from entering either the multi-fiber cable or the plurality of furcation tubes.

In one embodiment, the housing is cylindrical.

In one embodiment, a boot and a corresponding plug is positioned at both of the first end and the opposite end of the housing.

In one embodiment, the boot or boots snap or clip onto the respective plug or plugs.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A cable transition assembly for transitioning a plurality of optical fibers from a multi-fiber cable to a plurality of furcation tubes, the fiber optic transition assembly comprising:
    a housing defining an internal passageway extending along an elongate dimension of the housing, a first opening at a first end of the internal passageway, and a second opening at a second end of the internal passageway, the second end being opposite the first end along the elongate dimension;
    a first boot positioned partially outside the housing and partially inside the housing and extending through the first opening into the internal passageway, the first boot being positioned and configured to support the multi-fiber cable; and
    a second boot positioned partially outside the housing and partially inside the housing and extending through the second opening into the internal passageway, the second boot being configured to support the plurality of furcation tubes.

2. The cable transition assembly of claim 1, comprising a multi-fiber cable positioned in, and supported by, the first boot.

3. The cable transition assembly of claim 2, comprising a plurality of furcation tubes supported by the second boot, wherein a plurality of optical fibers of the multi-fiber cable extend from the multi-fiber cable through the internal passageway and through the plurality of furcation tubes.

4. The cable transition assembly of claim 1, wherein the housing is cylindrical.

5. The cable transition assembly of claim 1, comprising a volume of hardened epoxy positioned within the housing.

6. The cable transition assembly of claim 1, wherein the housing defines an enclosed epoxy injection port.

7. The cable transition assembly of claim 6, wherein the housing defines an enclosed vent aperture.

8. The cable transition assembly of claim 7, wherein the housing defines two enclosed epoxy injection ports.

9. The cable transition assembly of claim 1,
    wherein the second boot includes a body and a mounting collar;
    wherein the mounting collar of the second boot is positioned inside the housing and the body of the second boot is positioned outside the housing; and
    wherein a maximum dimension of the mounting collar of the second boot perpendicular to the elongate dimension is narrower than a corresponding maximum dimension of the body of the second boot.

10. The cable transition assembly of claim 9, wherein the maximum dimension of the body of the second boot is wider than a corresponding maximum dimension of the second opening.

11. The cable transition assembly of claim 9, wherein the body of the second boot includes a plurality of flex features.

12. The cable transition assembly of claim 11, wherein the plurality of flex features include notches.

13. The cable transition assembly of claim 11, wherein the plurality of flex features include the body of the second boot tapering along the elongate dimension.

14. The cable transition assembly of claim 9, wherein the mounting collar of the second boot is configured to be received inside the housing against an inner surface of the housing with a friction fit.

15. The cable transition assembly of claim 9,
    wherein the first boot includes a body and a mounting collar;
    wherein the mounting collar of the first boot is positioned inside the housing and the body of the first boot is positioned outside the housing; and
    wherein a maximum dimension of the mounting collar of the first boot perpendicular to the elongate dimension is narrower than a corresponding maximum dimension of the body of the first boot.

16. The cable transition assembly of claim 15, wherein the maximum dimension of the body of the first boot is wider than a corresponding maximum dimension of the first opening.

17. The cable transition assembly of claim 15, wherein the body of the first boot includes a plurality of flex features, the plurality of flex features including notches.

18. The cable transition assembly of claim 15, wherein the body of the first boot tapers along the elongate dimension.

19. The cable transition assembly of claim 15, wherein the mounting collar of the first boot is configured to be received inside the housing against an inner surface of the housing.

20. A method, comprising:
    assembling a conveyable assembly by:
        providing the cable transition assembly according to claim 1;
        supporting a multi-fiber cable in the first boot;
        supporting a plurality of furcation tubes in the second boot; and
    conveying the conveyable assembly thorough a cabling conduit by pulling, pushing and/or blowing the conveyable assembly though the cabling conduit.

* * * * *